P. SUMMERS.
STENCH-TRAP.
No. 178,485. Patented June 6, 1876.
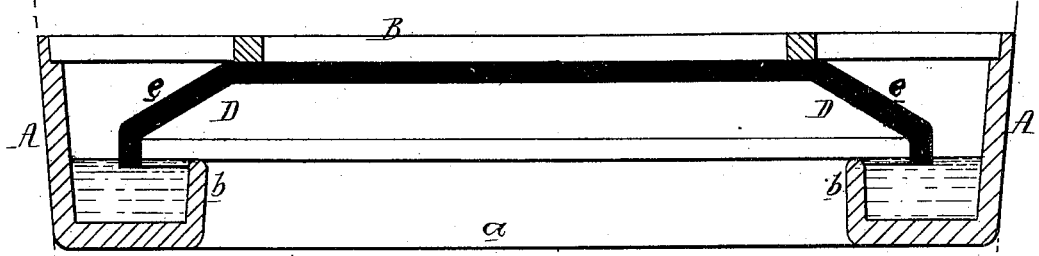
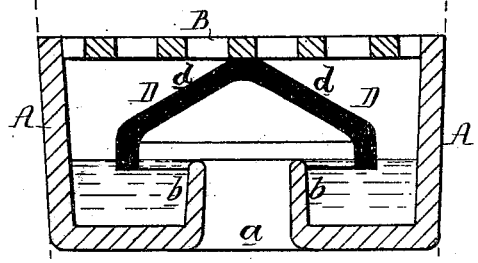
Witnesses
Harry Howson Jr
Harry Smith
Peter Summers,
by his Attorneys
Howson and Son

UNITED STATES PATENT OFFICE.

PETER SUMMERS, OF PHILADELPHIA, PENNSYLVANIA, ASSIGNOR OF ONE-HALF HIS RIGHT TO JOHN S. THACKRAY, OF SAME PLACE.

IMPROVEMENT IN STENCH-TRAPS.

Specification forming part of Letters Patent No. 178,485, dated June 6, 1876; application filed March 29, 1876.

*To all whom it may concern:*

Be it known that I, PETER SUMMERS, of Philadelphia, Pennsylvania, have invented certain Improvements in Stench-Traps, of which the following is a specification:

The object of my invention is to so construct a stench-trap that the entrance of water into the same will not be interfered with. This object I attain in the manner which I will now proceed to describe, reference being had to the accompanying drawing, in which—

Figure 1 is a longitudinal section of my improved stench-trap and Fig. 2 a transverse vertical section of the same.

A is a box or casing adapted to the shape of the sewer, inlet, or drain, into which the trap has to be placed, as shown by dotted lines, and secured within the same by any suitable cement. In the bottom of this box is a central opening, $a$, around which extends a flange, $b$. To the top of the box is adapted a detachable grating, B, to the under side of which is secured an inverted cup, D, the lower edges of which project below the upper edges of the flange $b$, so as to form the usual water-seal for preventing the upward passage of the noxious vapors generated below the trap.

The cup D is of peculiar shape, having inclined sides $d$ and inclined ends $e$, which unite at the top in a narrow strip, secured to the central bar of the grating B.

This form of cup facilitates the free entrance of water into the trap, thus overcoming a serious objection to the usual circular or bell-shaped dome.

The above-described stench-trap is cheap, compact, and simple in its construction, can be readily applied to and secured within an inlet or drain, and can be as readily removed when repairs are necessary.

I claim as my invention—

The combination of the casing A, having plain vertical sides, and the horizontal grating B, with the inverted cup D, having steeply-inclined sides $d$ and ends $e$, which unite at the top in a narrow strip, secured to the central longitudinal bar of said grating, as set forth.

In testimony whereof I have signed my name to this specification in the presence of two subscribing witnesses.

PETER SUMMERS.

Witnesses:
HUGH COLLINS,
HARRY SMITH.